United States Patent
Matsuo et al.

(10) Patent No.: US 11,595,244 B2
(45) Date of Patent: Feb. 28, 2023

(54) RECOVERY SUPPORT APPARATUS, RECOVERY SUPPORT METHOD AND PROGRAM

(71) Applicant: Nippon Telegraph and Telephone Corporation, Tokyo (JP)

(72) Inventors: Yoichi Matsuo, Tokyo (JP); Hiroki Ikeuchi, Tokyo (JP); Akio Watanabe, Tokyo (JP); Takehiro Kawata, Tokyo (JP); Ken Nishimatsu, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/291,050

(22) PCT Filed: Nov. 1, 2019

(86) PCT No.: PCT/JP2019/043084
§ 371 (c)(1),
(2) Date: May 4, 2021

(87) PCT Pub. No.: WO2020/100634
PCT Pub. Date: May 22, 2020

(65) Prior Publication Data
US 2021/0392036 A1    Dec. 16, 2021

(30) Foreign Application Priority Data
Nov. 14, 2018  (JP) .............................. JP2018-214190

(51) Int. Cl.
*G06F 15/173*    (2006.01)
*H04L 41/0654*   (2022.01)
(Continued)

(52) U.S. Cl.
CPC .......... *H04L 41/0654* (2013.01); *G06F 13/00* (2013.01); *G06Q 10/00* (2013.01);
(Continued)

(58) Field of Classification Search
CPC ............. H04L 41/0654; H04L 41/0627; H04L 41/0645; G06F 13/00; G06Q 10/00; G06Q 50/32
See application file for complete search history.

(56) References Cited

U.S. PATENT DOCUMENTS

| | | | | |
|---|---|---|---|---|
| 2008/0004841 A1* | 1/2008 | Nakamura | ............ | G06F 11/008 702/182 |
| 2010/0250200 A1* | 9/2010 | Mori | ....................... | G06F 30/20 703/1 |
| 2019/0384670 A1* | 12/2019 | Kuroki | .................. | G06F 11/079 |

FOREIGN PATENT DOCUMENTS

| | | | | |
|---|---|---|---|---|
| CN | 108322406 B | * | 10/2021 | ......... H04L 41/0654 |
| EP | 3605953 B1 | * | 6/2021 | .......... G06F 11/0709 |

(Continued)

OTHER PUBLICATIONS

Kawahara et al., "Application of AI to Network Operation," Communication Society Magazine, 2018, 12(45):29-38, 21 pages (with English Translation).

(Continued)

*Primary Examiner* — Richard G Keehn
(74) *Attorney, Agent, or Firm* — Fish & Richardson P.C.

(57) ABSTRACT

A recovery support apparatus includes an index value calculation means which calculates a predetermined index value with respect to a recovery work sequence on the basis of the recovery work sequence indicating a work procedure for recovery from an abnormality that has occurred in an apparatus group constituting a communication network, and an output means which outputs the index value calculated by the index value calculation means to a predetermined output destination.

15 Claims, 4 Drawing Sheets

(51) Int. Cl.
    *H04L 41/0604*     (2022.01)
    *H04L 41/0631*     (2022.01)
    *H04L 41/5074*     (2022.01)
    *G06F 13/00*     (2006.01)
    *G06Q 10/00*     (2023.01)
    *G06Q 50/32*     (2012.01)

(52) U.S. Cl.
    CPC ......... *G06Q 50/32* (2013.01); *H04L 41/0627* (2013.01); *H04L 41/0645* (2013.01); *H04L 41/5074* (2013.01)

(56) References Cited

FOREIGN PATENT DOCUMENTS

| | | | | |
|---|---|---|---|---|
| JP | 2006-31488 | 2/2006 | | |
| JP | 2008-9842 | 1/2008 | | |
| JP | 2018-170618 | 11/2018 | | |
| WO | WO-2018180364 A1 | * | 10/2018 | .......... G06F 11/0709 |
| WO | WO-2020100634 A1 | * | 5/2020 | ......... H04L 41/0627 |
| WO | WO-2021240695 A1 | * | 12/2021 | |

OTHER PUBLICATIONS

Watanabe et al., "Workflow Extraction for Service Operation using Multiple Unstructured Trouble Tickets," 2016 IEEE/IFIP Network Operations and Management Symposium, Apr. 2016, pp. 652-658.

\* cited by examiner

RECOVERY SUPPORT APPARATUS, RECOVERY SUPPORT METHOD AND PROGRAM

CROSS-REFERENCE TO RELATED APPLICATIONS

This application is a National Stage application under 35 U.S.C. § 371 of International Application No. PCT/JP2019/043084, having an International Filing Date of Nov. 1, 2019, which claims priority to Japanese Application Serial No. 2018-214190, filed on Nov. 14, 2018. The disclosure of the prior application is considered part of the disclosure of this application, and is incorporated in its entirety into this application.

TECHNICAL FIELD

The present invention relates to a recovery support apparatus, a recovery support method, and a program.

BACKGROUND ART

Recently, the number of management and control targets has increased and thus automation of control at the time of occurrence of an abnormality has been required in order to reduce operation load when an abnormality, a failure, an obstacle, a trouble, and the like (hereinafter, an abnormality, a failure, an obstacle, a trouble, and the like will be collectively referred to as simply "abnormality") have occurred in a virtualized network and the like. In particular, it is important to perform automatic recovery at the time of occurrence of an abnormality for minimization of an influence on a customer service, reduction of operation of an operator, and the like.

As a technology related to automatic recovery at the time of occurrence of an abnormality, a technology for automatically generating a recovery work sequence indicating a work procedure (hereinafter referred to as a "recovery work procedure") for recovery from an abnormality (hereinafter referred to as "automatic generation technology") is known. For example, a technology for creating and visualizing a recovery work procedure as a workflow using a plurality of trouble tickets is proposed (for example, Non-Patent Literature 1 and 2). Meanwhile, a trouble ticket is a corresponding record in which a recovery work procedure and the like at the time of occurrence of a past abnormality is described.

In the aforementioned automatic generation technology, for an alert generated in a communication network, for example, a common part of recovery work procedures described in a plurality of trouble tickets corresponding to the alert and branch points of work are automatically extracted. A recovery method at the time of occurrence of an abnormality may require trial and error or a plurality of recovery methods may be present, and different types of content are described in trouble tickets even for the same abnormality in many cases. Accordingly, in the automatic generation technology, a plurality of recovery work sequences are generated for each abnormality using a past recovery work procedure and the like described in a trouble ticket.

Here, with respect to an abnormality that has occurred many times in the past, handling of the abnormality has also been performed many times and thus a typical recovery work sequence can be generated from content described in trouble tickets. The typical recovery work sequence can be regarded as a correct recovery work procedure for the abnormality (that is, a work procedure that can reliably recover from the abnormality).

In addition, as a technology for automatically executing a recovery work sequence (hereinafter referred to as "automatic execution technology"), a tool (or a program and the like) called run book automation (RBA) is known. In recent years, such a tool is also provided by a network apparatus vendor and the like and automatic execution of a recovery work sequence is realized.

Furthermore, a rule-based method using a rule in which an alert that triggers automatic execution and a recovery work procedure correspond to each other one to one is also known. Such a rule is created, for example, by an operator or the like while checking an influence on a customer service and the system involved in execution of a recovery work procedure on the basis of successful cases at the time of occurrence of past abnormalities, and the like without using the aforementioned automatic generation technology.

CITATION LIST

Non Patent Literature

[NPL 1] A. Watanabe, K. Ishibashi, T. Toyono, T. Kimura, K. Watanabe, Y. Matsuo and K. Shiomoto, "Workflow Extraction for Service Operation using Multiple Unstructured Trouble Tickets", IEEE/IFIP NOMS 2016 (mini-conf.), pp. 652-658, April 2016.

[NPL 2] Ryoichi Kawahara, Keishiro Watanabe, Shigeaki Harada, Takehiro Kawata, "Application of AI to Network Operation", Communication Society Magazine, 12, vol. 1, pp. 29-38, 2018.

SUMMARY OF THE INVENTION

Technical Problem

Here, in the aforementioned automatic generation technology, whether a typical recovery work sequence can be generated depends on an abnormality type, the number of trouble tickets, and the like. However, since determination of whether a generated recovery work sequence is correct (that is, whether recovery from an abnormality can be reliably executed) is not performed, there are cases in which an erroneous recovery work is performed when the recovery work sequence is executed as it is. Meanwhile, an index value indicating the accuracy of a recovery work sequence will be represented as "stability" hereinafter.

On the other hand, the aforementioned automatic execution technology is specialized in determination on which recovery work sequence (that is, which recovery scenario) will be executed in many cases, and the like in many cases and does not consider an influence on a customer service and the system involved in execution of a recovery work sequence. However, network abnormalities, for example, occur due to operation at the time of recovery work in many cases. Accordingly, there are cases in which execution of a recovery work sequence leads to greater damage, and automatic execution of a recovery work sequence involves risk.

In addition, in the aforementioned rule-bases method, an operator or the like needs to check an influence on customer service and the system when the rule is created and thus considerable operation is required. Meanwhile, an index value indicating an influence on a customer service and a system involved in execution of a recovery work sequence (recovery work procedure) will be represented as "stability" hereinafter.

An object of the present invention devised in view of the aforementioned point is to provide stability and safety of a recovery work procedure.

Means for Solving the Problem

To accomplish the aforementioned object, a recovery support apparatus in an embodiment of the present invention includes an index value calculation means which calculates a predetermined index value with respect to a recovery work sequence on the basis of the recovery work sequence indicating a work procedure for recovery from an abnormality that has occurred in an apparatus group constituting a communication network, and an output means which outputs the index value calculated by the index value calculation means to a predetermined output destination.

Effects of the Invention

It is possible to provide stability and safety of a recovery work procedure.

DESCRIPTION OF EMBODIMENTS

Figure 1:
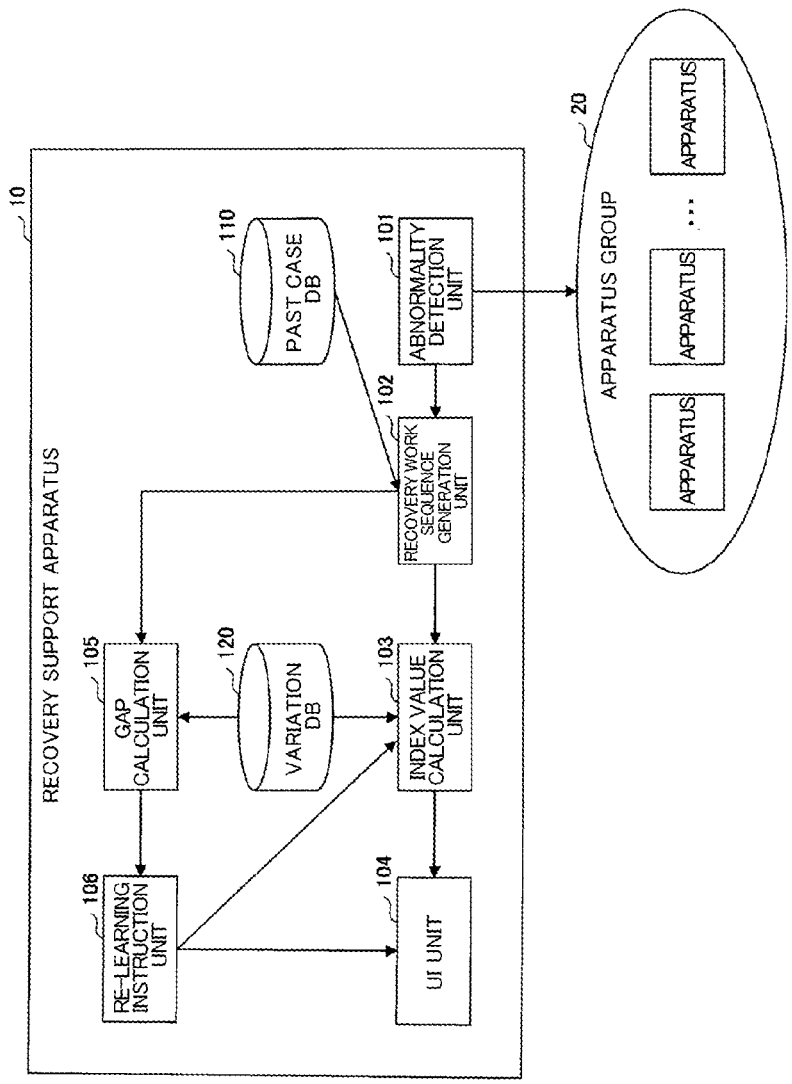
FIG. 1 is a diagram showing an example of an overall configuration of a system in an embodiment of the present invention.

Hereinafter, an embodiment of the present invention will be described. In the embodiment of the present invention, a recovery support apparatus 10 which supports recovery from an abnormality by generating one or more recovery work sequences for recovery from the abnormality when the abnormality has occurred in a communication network (also including a virtualized network) and providing stability and safety of the recovery work sequences to a user or the like is described. For example, the user or the like can determine whether to execute the recovery work sequences by checking the stability and safety (or the sum of stability and safety) of the recovery work sequences. Meanwhile, it is assumed that a recovery work sequence is generated, for example, by the automatic generation technology disclosed in Non-Patent Literature 1 or 2 in the embodiment of the present invention.

Here, the stability and safety (or the sum of the stability and safety) of a recovery work sequence may be provided to, for example, a tool or the like which realizes the automatic execution technology. In this case, the tool determines whether to execute the recovery work sequence on the basis of the stability and safety of the recovery work sequence.

In the embodiment of the present invention, a recovery work sequence is a work procedure (recovery work procedure) for recovery from an abnormality. A recovery work sequence is represented as work series with respect to a system. Meanwhile, a system includes various apparatuses (also including a network apparatus, a device which monitors or controls the network apparatus, and the like) constituting a communication network.

Work is operations (e.g., a command execution operation, an operation of searching for a character string in a log data, or the like) performed by an operator or the like with respect to a system, physical work (e.g., exchange of parts, and the like) performed by an engineer, or the like. That is, work is any recovery work (particularly, work including an operation with respect to a system) executed by a person for recovery from an abnormality. Meanwhile, a work procedure may also be called, for example, "workflow".

However, a recovery work sequence may be a command series for recovery from an abnormality. In this case, although the recovery work sequence may also be called "recovery command sequence" or simply "command sequence", it is assumed that a recovery command sequence (or command sequence) is also represented as "recovery work sequence" in the embodiment of the present invention. Similarly, it is assumed that each command constituting a recovery command sequence is also represented as "work". That is, "recovery work sequence" may be a series of any work (work series) executed by a person for recovery from an abnormality or a command series for recovery from an abnormality in the embodiment which will be described later.

Here, as described above, stability is an index value indicating the accuracy of a recovery work sequence and safety is an index value indicating an influence on customer service and a system involved in execution of a recovery work sequence. Meanwhile, an influence on a customer service and a system means that the customer service and the system are temporarily unavailable or use thereof is restricted because communication is cut off according to recovery work or a command, or high-load work or the like is performed on the system, for example. High-load work for a system includes, for example, work that causes all or some functions of a system to be temporarily unavailable, such as "system restart" and "down/up of communication interface" in addition to work that is processed with a high load, such as "character string search through entire system".

<Stability>

Although a plurality of recovery work sequences are generated for each abnormality according to the automatic generation technology disclosed in the aforementioned Non-Patent Literature 1 or 2 in the embodiment of the present invention, it is considered that the accuracy can be determined according to whether a recovery work sequence is typical. Accordingly, stability is defined as "uniqueness of recovery work sequence". The stability of the recovery work sequence is acquired by calculating this uniqueness.

Although any method can be used as a method for calculating uniqueness, methods such as calculating entropy, calculating perplexity, and calculating a probability of each task constituting a recovery work sequence, for example, are conceivable. Hereinafter, as an example, the method of calculating a probability of each task constituting a recovery work sequence will be described.

A recovery work sequence generated for a certain abnormality s is represented by the following mathematical expression.

$$x_1^s, \ldots, x_N^s \qquad \text{[Formula 1]}$$

Here, N is the number of tasks constituting the recovery work sequence, and $x_i^s$ (i=1, . . . , N) is an M-dimensional vector having probabilities of M types of tasks as elements $x_{ij}^s$ (j=1, . . . , M). M is the number of types of tasks for recovery from the abnormality.

In addition, it is assumed that a task of a type having a highest probability from among tasks is executed when the recovery work sequence is executed. That is, it is assumed that a task represented by the following mathematical expression is executed for i=1, ..., N.

$$x_i^s = \max_{j \in \{1,\ldots,M\}} x_{ij}^s \quad \text{[Formula 2]}$$

That is, it is assumed that there are three types (i.e., M=3) of tasks (commands) of "systemctl stop network", "system start network" and "shutdown –h npw", for example, and xi=[0.9, 0, 0.1] for a certain i. In this case, "systemctl stop network" having a probability of 90% is executed as an i-th task.

Here, stability is calculated as follows.
[Formula 3]

$$\text{Stability} = \sum_{i=1}^{N} \log \left( \max_{j \in \{1,\ldots,M\}} x_{ij}^s \right)$$

For example, when a certain abnormality of the same type has occurred a large number of times in the past, a large number of trouble tickets corresponding to the abnormality are present and it is considered that a recovery work procedure is fixed, and thus a probability $x_{ij'}^s$, ($j' \in \{1, \ldots, M\}$) of a certain specific type of work increases in $x_i^s$ constituting the recovery work sequence. Accordingly, with respect to an abnormality that has frequently occurred in the past, the stability of the recovery work sequence for this abnormality increases.

On the other hand, with respect to a rare abnormality (that is, an abnormality that has rarely occurred in the past), a recovery work procedure is hardly fixed and a probability $x_i^s$ (j=1, ..., M) of any type of work rarely changes in $x_i^s$ constituting a recovery work sequence in many cases. Accordingly, with respect to a rare abnormality, the stability of the recovery work sequence for this abnormality decreases.

<Safety>

During work for recovery from an abnormality, cut off of communication may occur or a high load may be applied to a system (e.g., system restart, character string search through an entire system, and the like). Accordingly, there are cases in which customer service becomes unavailable unexpectedly or other services are affected (that is, there are cases in which a secondary disaster occurs due to recovery work).

Accordingly, the safety of a recovery work sequence will be defined below.

(Definition of Safety (1))

In definition of safety (1), safety is defined as a "value according to a total value of a degree of influence of each task $x_i^s$ (i=1, ..., N) constituting a recovery work sequence on a performance value of a system and a degree of influence on the communication property of a communication network". The safety of the recovery work sequence is acquired by calculating the value according to this total value.

Here, a performance value of a system is use rates of various hardware resources such as computation resources (e.g., a central processing unit (CPU) and the like), memory resources (e.g., a hard disk drive (HDD) and the like), a communication interface of the system, and the like.

Here, the safety is calculated as follows.
[Formula 3]

$$\text{Safety} = \sum_{i=1}^{N} \log \frac{1}{y} = \sum_{i=1}^{N} \log \left( \frac{1}{f\left( \max_{j \in \{1,\ldots,M\}} x_{ij}^s \right)} \right)$$

Here, the function f(•) is a function for predicting a total value y of a degree of influence of a task $x_i^s$ on the performance value of the system and a degree of influence of the task on the communication property of the communication network and is learned in advance according to a machine learning method. Accordingly, the safety of a recovery work sequence increases as a total value of degrees of influence (a total value of a degree of influence on a performance value and a degree of influence on a communication property) of each task $x_i^s$ constituting the recovery work sequence decreases, whereas the safety of the recovery work sequence decreases as the total value increases.

As a method of learning the function f, for example, for each task $x_i^s$ described in past trouble tickets, a total value y of a degree influence on the performance value of the system and a degree of influence on the communication property of the communication network when the task has been executed is first assigned as correct-solution data to generate learning data. This learning data may be generated, for example, by an operator or the like assigning correct-solution data to respective tasks $x_i^s$ described in the past trouble tickets.

Then, learning may be performed according to any optimization method using the learning data such that $f(x_i^s)$ approaches the correct-solution data y. Here, support vector regression (SVR), a deep neural network (DNN) or the like can be used as f, for example. Meanwhile, the following reference literature 1, for example, can be referred to with respect to SVR and the following reference literature 2, for example, can be referred to with respect to a DNN.

[Reference Literature 1]

V. Vapnik, A. Lerner, "Pattern recognition using generalized portrait method", Automation and Remote Control, 24, 1963.

[Reference Literature 2]

D. S. Broomhead, David Lowe, "Radial basis functions, multi-variable functional interpolation and adaptive networks", (Technical report). RSRE. No. 4148,1988.

Here, degrees of influence (that is, a degree of influence on a performance value of a system and a degree of influence on a communication property of a communication network) can be arbitrarily determined by an operator. However, it is desirable to determine the degrees of influence on the basis of variation in the performance value per unit time (hereinafter represented as "performance value variation") and variation in the communication property per unit time (hereinafter represented as "communication property variation"), for example. Accordingly, the degrees of influence can be set to indexes by which influences on the system and the communication network can be predicted in advance when work has been executed. Meanwhile, the performance value variation can be acquired, for example, according to a system admin reporter (sar) command. In addition, the communication property variation can be acquired, for example, according to a ping or the like. Down/up of a communication interface can be acquired, for example, from an alert or the like from the system.

In addition, with respect to an item that an operator particularly wants to emphasize (e.g., a communication property), a degree of influence on variation therein may be increased. Accordingly, degrees of influence according to operations of the system and the communication network can be calculated.

Further, there are cases in which only a few past trouble tickets are present because abnormalities rarely occur, and the like. In such cases, only a small amount of learning data can be generated using the aforementioned learning method. Accordingly, in such a case, learning data may be generated, for example, by executing a large number of tasks (e.g., a large number of commands) in a normal case and determining degrees of influence from performance value variation and communication property variation at that time. This is based on the idea that process restart or the like has the same influence on a performance value and a communication property in both a normal case and an abnormal case. Accordingly, it is possible to generate a large amount of learning data even in cases in which only a few past trouble tickets are present.

(Definition of Safety (2))

In definition of safety (1), safety has been defined as a "value according to a total value of a degree of influence of each task $x_i^s$ (i=1, . . . , N) constituting a recovery work sequence on a performance value of a system and a degree of influence on the communication property of a communication network". Accordingly, when an operator generates learning data, he/she needs to determine degrees of influence from performance value variation and communication property variation and then assign correct-solution data to each task $x_i^s$, for example. Accordingly, when a large amount of learning data is generated, the operator may perform numerous operations.

Therefore, safety may be defined as "a total value of values of performance value variation of a system and communication property variation of a communication network in a case where each task $x_i^s$ (i=1, . . . , N) constituting a recovery work sequence has been executed" in definition of safety (2). Accordingly, operations of the operator when learning data is generated can be reduced because performance value variation acquired according to a sar command, communication property variation acquired according to a ping or the like, and the like can be used as correct-solution data, for example.

It is assumed that $y_i$ is a K-dimensional vector having performance value variations and communication property variations as elements $y_k$. Here, K is a total number of performance value variation types and communication property variation types. For example, in a case where "CPU use rate" and "memory use rate" are used as performance value variations and "ping communication degree" is used as communication property variation, K=3.

In addition, a function f which predicts each element $y_{ik}$ of $y_i$, represented by the following mathematical expression, is learned in advance.

$$y_i f(x_i^s) \qquad \text{[Formula 5]}$$

That is, the function f(•) is learned in advance as a function which predicts performance value variation and communication property variation from a task $x_i^s$. Meanwhile, f is represented as f=(f1, . . . , fk, . . . , fK) having a function which predicts a k-th element (that is, k-th variation) of $y_i$ as fk.

Here, safety is calculated as follows.
[Formula 6]

$$\text{Safety} = \sum_{i=1}^{N} \log \frac{1}{y_i}$$

Although a method of learning the function f is the same as that with respect to the function f when degrees of influence are predicted, performance value variations and communication property variations according to p types of variations predicted through fk are used as correct-solution data. Meanwhile, the function f can use, for example, SVR, a DNN, or the like, as described above.

In addition, for example, when only a few past trouble tickets are present because abnormalities rarely occur, and the like, as described above, a large number of tasks (e.g., a large number of commands) may be executed in a normal case and learning data may be generated from performance value variation and communication property variation at that time. This is based on the idea that process restart or the like has the same performance value variation and communication property variation in both a normal case and an abnormal case. Accordingly, it is possible to generate a large amount of learning data even in cases in which only a few past trouble tickets are present.

<Overall Configuration of System>

Next, an overall configuration of a system in an embodiment of the present invention will be described with reference to FIG. 1. FIG. 1 is a diagram showing an example of the overall configuration of the system in the embodiment of the present invention.

As shown in FIG. 1, the system in the embodiment of the present invention includes the recovery support apparatus 10 and an apparatus group 20.

The apparatus group 20 includes various apparatuses (e.g., a network apparatus, a device which monitors or controls the network apparatus, and the like) constituting a communication network. Customer service and the like are realized by each apparatus included in the apparatus group 20.

The recovery support apparatus 10 is a computer or a computer system which detects an abnormality that has occurred in the apparatus group 20 and supports recovery from the abnormality. Here, the recovery support apparatus 10 generates one or more recovery work sequences for recovery from the abnormality and provides stability and safety of these recovery work sequences to a user or the like. Meanwhile, the recovery support apparatus 10 may be a server or the like which is composed of a plurality of computers or may be a personal computer (PC) or the like.

Here, the recovery support apparatus 10 includes an abnormality detection unit 101, a recovery work sequence generation unit 102, an index value calculation unit 103, a UI unit 104, a gap calculation unit 105, and a re-learning instruction unit 106. These functional units are realized by a processor caused to execute processing by one or more programs installed in the recovery support apparatus 10.

In addition, the recovery support apparatus 10 includes a past case DB 110 and a variation DB 120. These DBs (databases) can be realized using an auxiliary storage device such as an HDD, for example. Meanwhile, at least one of these DBs may be realized using a storage device or the like connected to the recovery support apparatus 10 through a communication network.

The abnormality detection unit 101 detects an abnormality that has occurred in an apparatus included in the apparatus group 20. Meanwhile, the abnormality detection unit 101 may detect the abnormality according to a known arbitrary abnormality detection technology. For example, the abnormality detection unit 101 may detect an abnormality by checking activation/deactivation of each apparatus included in the apparatus group 20 or detect an abnormality by receiving an alert from each apparatus included in the apparatus group 20.

The recovery work sequence generation unit 102 generates one or more recovery work sequences for recovery from an abnormality using the automatic generation technology disclosed in the aforementioned Non-Patent Literature 1 and Non-Patent Literature 2, for example, when the abnormality is detected by the abnormality detection unit 101. Here, the recovery work sequence generation unit 102 generates each recovery work sequence using trouble tickets stored in the past case DB 110, or the like. Meanwhile, although a single recovery work sequence may be generated, it is assumed that a plurality of recovery work sequences are generated in the embodiment of the present invention.

Here, past trouble tickets are stored in the past case DB 110. However, information necessary for generation of recovery work sequences and detection of abnormalities (e.g., configuration information of the apparatus group 20, and the like) may be stored in the past case DB 110 in addition thereto.

The index value calculation unit 103 calculates stability and safety as index values for each of the plurality of recovery work sequences generated by the recovery work sequence generation unit 102. Here, the index value calculation unit 103 calculates safety using performance value variations and communication property variations stored in the variation DB 120. Meanwhile, the safety calculated by the index value calculation unit 103 is calculated using the aforementioned Formula 4 and Formula 6 and is specifically a predictive value of safety.

Here, the variation DB 120 stores performance value variation and communication property variation for each task that has been executed. However, a degree of influence of the task on performance value variation and a degree of influence on communication property variation may be stored in the variation DB 120 in addition thereto.

The UI unit 104 outputs stability and safety calculated by the index value calculation unit 103 to a user interface (UI) or the like to present them to a user.

The gap calculation unit 105 calculates a gap between a predictive value of safety and an actual measurement value of safety of a recovery work sequence when the recovery work sequence has been executed. Here, the actual measurement value of safety is safety that is calculated using performance value variation and communication property variation actually acquired from the executed recovery work sequence.

Meanwhile, when the definition of safety is "definition of safety (1)", an actual measurement value calculated according to "definition of safety (1)" is used with respect to an actual measurement value of safety. Likewise, when the definition of safety is "definition of safety (2)", an actual measurement value calculated according to "definition of safety (2)" is used with respect to an actual measurement value of safety.

The re-learning instruction unit 106 instructs re-learning of the function f when a gap calculated by the gap calculation unit 105 is equal to or greater than a predetermined threshold value (that is, when a gap between a predictive value and an actual measurement value of safety is large).

Meanwhile, although a case in which a single apparatus includes the respective functional units and the respective DBs is shown in the example of FIG. 1, this is an example and some functional units and some DBs may be included in another apparatus. That is, the above-described respective functional units and respective DBs may be distributed and included in a plurality of apparatuses.

<Recovery Support Processing>

Figure 2:
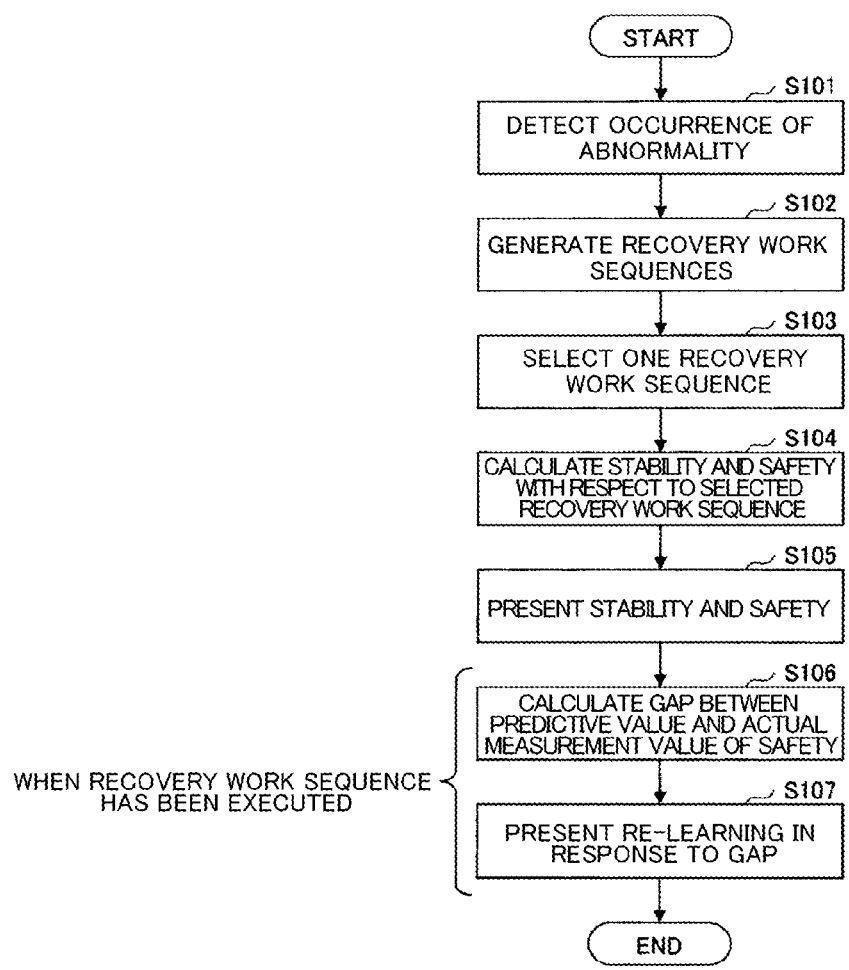
FIG. 2 is a flowchart showing an example of recovery support processing in an embodiment of the present invention.

Next, processing for supporting recovery from an abnormality (recovery support processing) when the abnormality has occurred in an apparatus included in the apparatus group 20 will be described with reference to FIG. 2. FIG. 2 is a flowchart showing an example of the recovery support processing in the embodiment of the present invention.

First, the abnormality detection unit 101 detects an abnormality that has occurred in an apparatus included in the apparatus group 20 (step S101). Next, the recovery work sequence generation unit 102 generates a plurality of recovery work sequences according to a known automatic generation technology using trouble tickets stored in the past case DB 110, and the like (step S102).

Next, the index value calculation unit 103 selects one of the plurality of recovery work sequences generated in the aforementioned step S102 (step S103). Then, the index value calculation unit 103 calculates stability according to the aforementioned Formula 3 and calculates safety according to the aforementioned Formula 4 or Formula 6 with respect to the selected recovery work sequence using information (performance value variation, communication property variation, degrees of influence, and the like) stored in the variation DB 120 (step S104). Meanwhile, it is determined in advance whether to calculate safety according to the aforementioned Formula 4 or Formula 6 using configuration information or the like, for example.

Here, when there are recovery work sequences that are not selected yet in the aforementioned step S103, processing returns to step S103. Accordingly, the stability and safety of each recovery work sequence included in the plurality of recovery work sequences are calculated in the aforementioned step S104.

The UI unit 104 outputs the stability and safety (or the sum thereof) of each recovery work sequence to a UI or the like (step S105). Accordingly, the stability and safety (or the sum thereof) of each of the plurality of recovery work sequences generated in the aforementioned step S102 are presented to a user. Meanwhile, the user can select which recovery work sequence will be executed with reference to stabilities and safeties (or the sum thereof), for example. A recovery work sequence is selected by the user and executed. Accordingly, recovery from the abnormality that has occurred in the apparatus included in the apparatus group 20 is performed.

Here, the stability and safety (or the sum thereof) of each recovery work sequence may be provided to a tool or the like which realizes the automatic execution technology, for example, as described above. In this case, the tool determines which recovery work sequence will be executed on the basis of the stability and safety (or the sum thereof) of each recovery work sequence and then causes the recovery work sequence to be executed. Meanwhile, such a tool may determine that a recovery work sequence having highest stability and safety that are both equal to or greater than a predetermined threshold value is executed, for example.

In this manner, the output destination of the stability and safety of each recovery work sequence may be a UI, or a program of a tool which realizes the automatic execution technology, or the like. In addition to these, the output destination of the stability and safety may be an auxiliary storage device such as an HDD, other devices connected through a communication network, or the like.

When the recovery work sequence has been executed, the gap calculation unit 105 calculates a gap between a predictive value and an actual measurement value of the safety of the recovery work sequence (step S106). Here, the gap may be, for example, a difference between the predictive value and the actual measurement value of the safety of the recovery work sequence.

Subsequently, the re-learning instruction unit 106 instructs re-learning of the function f when the gap calculated in the aforementioned step S106 is equal to or greater than a predetermined threshold value (that is, when the gap between the predictive value and the actual measurement value of the safety is large) (step S107). Here, the re-learning instruction unit 106 may re-learn the function f by instructing the index value calculation unit 103 to perform re-learning or present a UI which causes the user to re-learn the function f by instructing the UI unit 104 to perform re-learning.

Meanwhile, although both the stability and safety of a recovery work sequence have been calculated in the embodiment of the present invention, it is not necessary to calculate both and only any one of the stability and safety may be calculated.

<Specific Example>

Here, a specific example of calculation of stability and safety will be described using workflows of FIG. 3. The workflows shown in FIG. 3 are an example of workflows (that is, workflows relating to recovery work) visualized by the technology disclosed in the aforementioned Non-Patent Literature 1 using past trouble tickets when a certain abnormality s has occurred.

Figure 3:
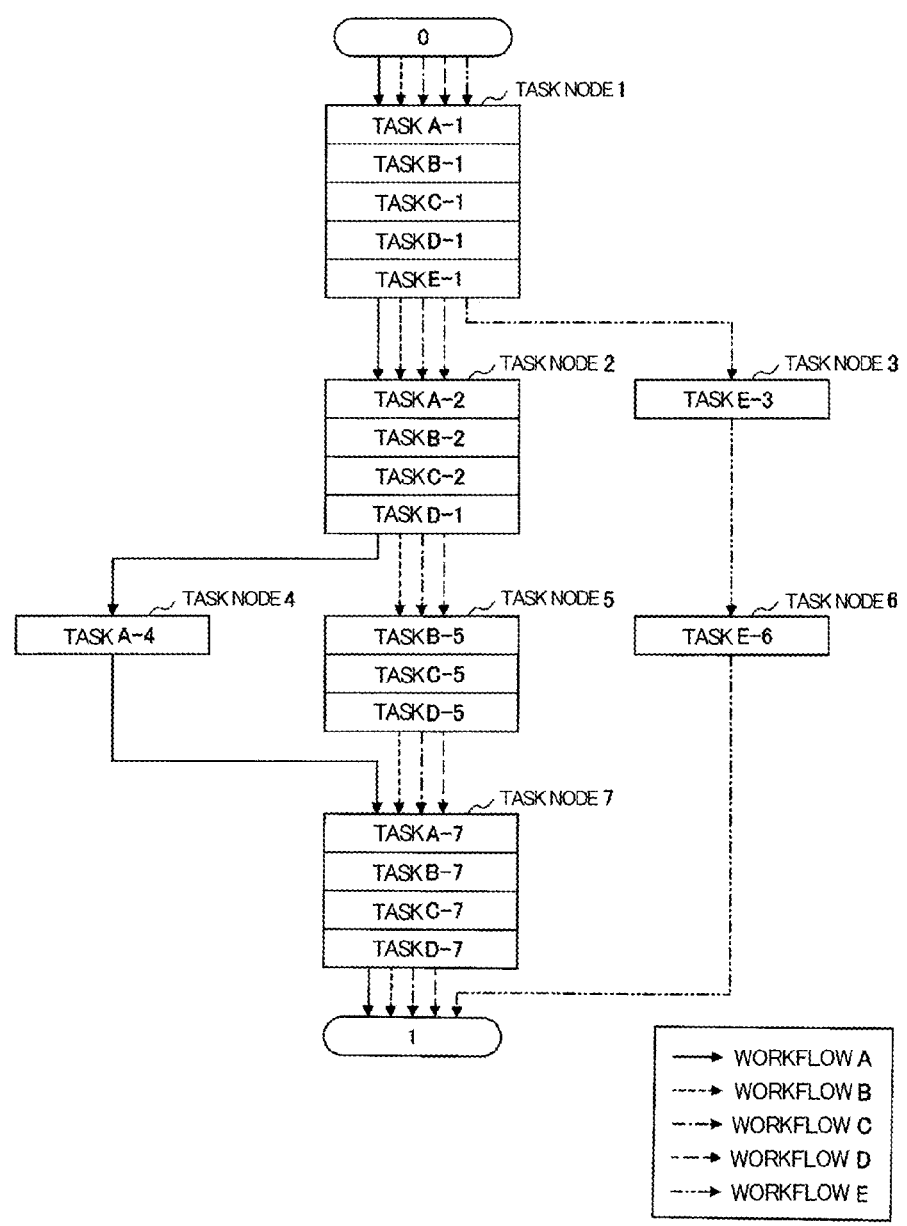
FIG. 3 is a diagram showing an example of a workflow pertaining to recovery work.

In the example shown in FIG. 3, a task node is a node indicating a single task constituting a workflow. Further, in each box in a task node, specific tasks executed through a workflow that passes through the node are described. For example, workflow A passes through task node 1→task node 2→task node 4→task node 7, executes "task A-1" at task node 1, executes "task A-2" at task node 2, executes "task A-4" at task node 4, and executes "task A-7" at task node 7. Likewise, workflow B passes through task node 1→task node 2→task node 5→task node 7, executes "task B-1" at task node 1, executes "task B-2" at task node 2, executes "task B-5" at task node 5, and executes "task B-7" at task node 7. The same applies to other workflows.

In addition, respective tasks described in respective boxes in the same task node are regarded as tasks having substantially the same content. For example, if task node 1 is a node representing task content of "abnormality detection", all of "task A-1" to "task E-1" represent specific tasks for abnormality detection. For example, "task A-1" is "abnormality detection according to an alert from ABC monitoring device", "task B-1" is "abnormal detection according to telephone contact from a person in charge of maintenance," "task C-2" is "abnormality detection according to an alert from EFG monitoring device", and the like. The same is applies to other task nodes and boxes.

Further, the number of boxes in the same task node indicates the frequency of execution of the task, and the number of arrows from a certain task node to another task node indicates the frequency of transition from a certain task to another task. For example, the frequency of execution of the task of task node 1 is "5", the frequency of execution of the task of task node 2 is "4" and the like. Likewise, the frequency of transition from task node 1 to task node 2 is "4", the frequency of transition from task node 1 to task node 3 is "1" and the like. The same applies to other task nodes.

Stability and safety are calculated for each workflow (that is, a recovery work sequence) in the example shown in FIG. 3 as follows.

(Stability)

Workflow A: passes through respective task nodes of task node 1→task node 2→task node 4→task node 7. Accordingly, a probability of the task of task node 2 becomes $4/5$ using the frequency of transition from task node 1 to task node 2. Likewise, a probability of the task of task node 4 becomes $1/4$ using the frequency of transition from task node 2 to task node 4. Likewise, a probability of the task of task node 7 becomes 1 using the frequency of transition from task node 4 to task node 7. Accordingly, the stability of workflow A is $\log(4/5)+\log(1/4)=-\log 5$.

Workflow B: The stability of workflow B is $\log(4/5)+\log(3/4)=\log(3/5)$ through calculation as above. The same applies to workflow C and workflow D.

Workflow E: The stability of workflow E is $\log(1/5)=-\log 5$ through calculation as above.

Accordingly, with respect to stabilities, workflow B (=workflow C=workflow D)>workflow A=workflow E.

(Safety)

In the example shown in FIG. 3, it is assumed that the function f is learned in advance such as f(task A-4)=5, f(task E-6)=3, f(task B-5)=f(task C-5)=f(task D-5)=10, f(task A-7)=f(task B-7)=f(task C-7)=f(task D-7)=1, and f(other tasks)=0 for simplification.

Workflow A: The safety of workflow A is $\log(1/5)+\log(1/1)=\log(1/5)$.

Workflow B: The safety of workflow B is $\log(1/10)+\log(1/1)=\log(1/10)$ through calculation as above.

Workflow E: The safety of workflow E is $\log(1/3)+\log(1/1)=\log(1/3)$ through calculation as above.

Accordingly, with respect to safeties, workflow E>workflow A>workflow B (=workflow C=workflow D).

As described above, workflow B (=workflow C=workflow D)>workflow A=workflow E with respect to stabilities and workflow E>workflow A>workflow B (=workflow C=workflow D) with respect to safeties in the example shown in FIG. 3.

This means that the number of past executions of workflow B (=workflow C and workflow D) is large and a degree of influence thereof on the system is high, for example. Accordingly, the user can ascertain that it is necessary to carefully determine execution of workflow B (=workflow C and workflow D) in consideration of the performance value and communication property of the system. In this manner, it is possible to perform appropriate determination or decision at the time of determination of execution of a recovery work sequence, automatic execution of a recovery work sequence, and the like by presenting the stability and safety of a recovery work sequence.

In addition, since the recovery support apparatus 10 calculates the stability and safety of a recovery work sequence, an operator does not need to confirm the stability and safety of the recovery work sequence through a system configuration diagram or the like and can reduce operations caused by occurrence of an abnormality.

<Hardware Configuration of Recovery Support Apparatus 10>

Figure 4:
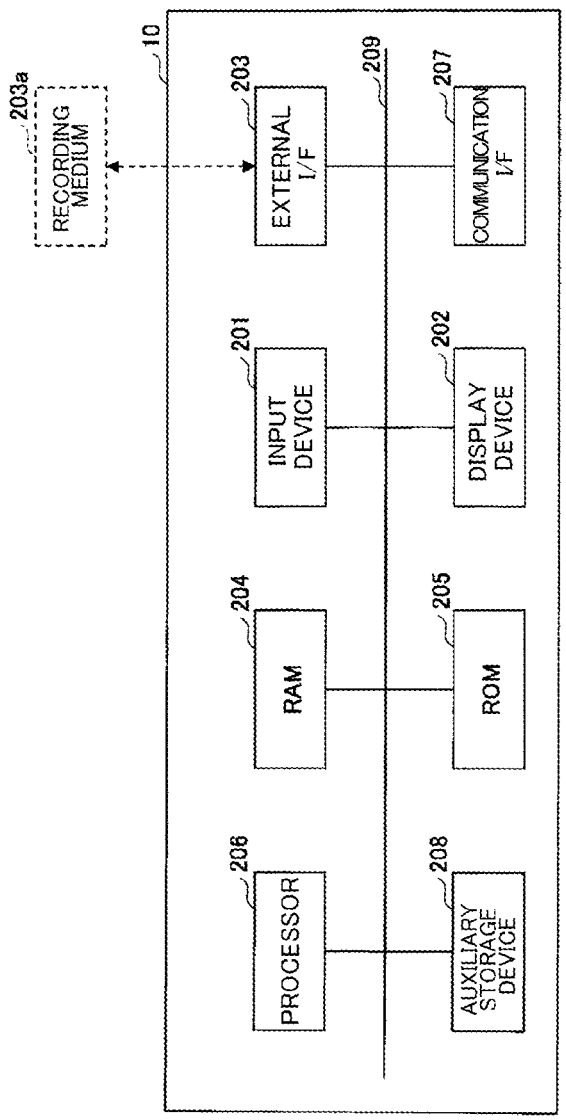
FIG. 4 is a diagram showing an example of a hardware configuration of a recovery support apparatus in an embodiment of the present invention.

Finally, a hardware configuration of the recovery support apparatus 10 in the embodiment of the present invention will be described with reference to FIG. 4. FIG. 4 is a diagram showing an example of the hardware configuration of the recovery support apparatus 10 in the embodiment of the present invention.

As shown in FIG. 4, the recovery support apparatus 10 in the embodiment of the present invention includes an input device 201, a display device 202, an external I/F 203, a random access memory (RAM) 204, a read only memory (ROM) 205, a processor 206, a communication I/F 207, and an auxiliary storage device 208. These hardware components are connected through a bus 209 such that they can communicate.

The input device 201 is a keyboard, a mouse, a touch panel, or the like, for example, and is used by a user to input various operations. The display device 202 is a display or the like, for example, and displays processing results of the recovery support apparatus 10. Meanwhile, the recovery support apparatus 10 may not include at least one of the input device 201 and the display device 202.

The external I/F 203 is an interface with external devices. External devices include a recording medium 203a and the like. The recovery support apparatus 10 can perform read, write and the like of the recording medium 203a through the external I/F 203. One or more programs that realize each functional unit (e.g., the abnormality detection unit 101, the recovery work sequence generation unit 102, the index value calculation unit 103, the UI unit 104, the gap calculation unit 105, the re-learning instruction unit 106, or the like) included in the recovery support apparatus 10 may be recorded in the recording medium 203a.

The recording medium 203a includes, for example, a flexible disk, a compact disc (CD), a digital versatile disk (DVD), a secure digital (SD) memory card, a universal serial bus (USB) memory card, and the like.

The RAM 204 is a volatile semiconductor memory which temporarily holds programs and data. The ROM 205 is a nonvolatile semiconductor memory capable of holding programs and data even when power is cut. The ROM 205 stores, for example, configuration information with respect to an operating system (OS), configuration information with respect to a communication network, and the like.

The processor 206 is a CPU, a graphics processing unit (GPU), or the like, for example, and is an arithmetic operation device which reads programs and data from the ROM 205, the auxiliary storage device 208 and the like to the RAM 204 and executes processing. Meanwhile, the recovery support apparatus 10 may include both a CPU and a GPU as the processor 206 or only any one of the CPU and the GPU.

The communication I/F 207 is an interface for connecting the recovery support apparatus 10 to a communication network. One or more programs that realize each functional unit included in the recovery support apparatus 10 may be acquired (downloaded) from a predetermined server device or the like via the communication I/F 207.

The auxiliary storage device 208 is an HDD, a solid state drive (SSD), or the like, for example, and is a nonvolatile storage device that stores programs and data. Programs and data stored in the auxiliary storage device 208 include, for example, an OS, various application programs, one or more programs that realize each functional unit included in the recovery support apparatus 10, and the like.

The recovery support apparatus 10 in the embodiment of the present invention can realize the above-described various types of processing by including the hardware configuration shown in FIG. 4. Meanwhile, although a case in which the recovery support apparatus 10 in the embodiment of the present invention is realized by a single apparatus (computer) has been described in the example shown in FIG. 4, the present invention is not limited thereto. The recovery support apparatus 10 in the embodiment of the present invention may be realized by a plurality of apparatuses (computers). In addition, the recovery support apparatus 10 in the embodiment of the present invention may be realized by an apparatus (computer) including a plurality of processors 206 and a plurality of memories (RAM 204, ROM 205, auxiliary storage device 208, and the like).

While the present embodiment has been described, the present invention is not limited to such a specific embodiment and various modifications and substitutions can be made without departing from the spirit or scope of the present invention.

REFERENCE SIGNS LIST

10 Recovery support apparatus
20 Apparatus group
101 Abnormality detection unit
102 Recovery work sequence generation unit
103 Index value calculation unit
104 UI unit
105 Gap calculation unit
106 Re-learning instruction unit
110 Past case DB
120 Variation DB

The invention claimed is:

1. A recovery support apparatus comprising:
a recovery work sequence generation unit, including one or more processors, configured to generate one or more recovery work sequences to recover from an abnormality that has occurred in an apparatus group constituting a communication network;
an index value calculation unit, including one or more processors, configured to calculate, as a predetermined index value with respect to the one or more recovery work sequences, at least one of i) stability of the recovery work sequences indicating certainty that recovery from the abnormality is possible according to execution of the recovery work sequences, and ii) safety of the recovery work sequences indicating influences on a performance value of the apparatus group and communication property of the communication network according to execution of the recovery work sequences;
an output unit configured to output the predetermined index value for the one or more recovery work sequences calculated by the index value calculation unit to a predetermined output destination;
an abnormality detection unit configured to detect the abnormality by (1) checking activation/deactivation of each apparatus included in the apparatus group or (2) receiving an alert from an apparatus included in the apparatus group;
a gap calculation unit configured to calculate a gap between a predictive value of the safety of the recovery work sequences and an actual measurement of the safety of the recovery work sequences in the recovery work sequences being executed; and
a re-learning instruction unit configured to instruct re-learning of a function that predicts performance value variation and communication property variation from one or more tasks associated with the recovery work sequences when the gap is equal to or greater than a predetermined threshold value, wherein the re-learning instruction unit is configured to instruct the index value calculation unit to perform the re-learning.

2. The recovery support apparatus according to claim 1, wherein the index value calculation unit calculates the safety of the recovery work sequences using a function that has learned in advance a total value of a degree of influence on the performance value and a degree of influence on the communication property in a case where each task included in the recovery work sequences has been executed in advance.

3. The recovery support apparatus according to claim 2, wherein the index value calculation unit calculates the safety of the recovery work sequences using SVR or a DNN as the function.

4. The recovery support apparatus according to claim 1, wherein the index value calculation unit calculates the safety of the recovery work sequences using a function that has learned in advance variation in the performance value and variation in the communication property in a case where each task included in the recovery work sequences has been executed.

5. The recovery support apparatus according to claim 1, wherein the index value calculation unit calculates the stability of the recovery work sequences using a probability of each task included in the recovery work sequences being executed, an entropy or perplexity.

6. A recovery support method performed using a computer, comprising:
   a recovery work sequence generation procedure of generating one or more recovery work sequences to recover from an abnormality that has occurred in an apparatus group constituting a communication network;
   an index value calculation procedure of calculating, as a predetermined index value with respect to the one or more recovery work sequences, at least one of i) stability of the recovery work sequences indicating certainty that recovery from the abnormality is possible according to execution of the recovery work sequences, and ii) safety of the recovery work sequences indicating influences on a performance value of the apparatus group and communication property of the communication network according to execution of the recovery work sequences;
   an output procedure of outputting the predetermined index value for the one or more recovery work sequences calculated through the index value calculation procedure to a predetermined output destination;
   an abnormality detection procedure of detecting the abnormality by (1) checking activation/deactivation of each apparatus included in the apparatus group or (2) receiving an alert from an apparatus included in the apparatus group;
   a gap calculation procedure of calculating a gap between a predictive value of the safety of the recovery work sequences and an actual measurement of the safety of the recovery work sequences in the recovery work sequences being executed; and
   a re-learning instruction procedure of instructing re-learning of a function that predicts performance value variation and communication property variation from one or more tasks associated with the recovery work sequences when the gap is equal to or greater than a predetermined threshold value, wherein the re-learning instruction procedure includes instructing the index value calculation procedure to perform the re-learning.

7. The recovery support method according to claim 6, wherein the index value calculation procedure calculates the safety of the recovery work sequences using a function that has learned in advance a total value of a degree of influence on the performance value and a degree of influence on the communication property in a case where each task included in the recovery work sequences has been executed in advance.

8. The recovery support method according to claim 7, wherein the index value calculation procedure calculates the safety of the recovery work sequences using SVR or a DNN as the function.

9. The recovery support method according to claim 6, wherein the index value calculation procedure calculates the safety of the recovery work sequences using a function that has learned in advance variation in the performance value and variation in the communication property in a case where each task included in the recovery work sequences has been executed.

10. The recovery support method according to claim 6, wherein the index value calculation procedure calculates the stability of the recovery work sequences using a probability of each task included in the recovery work sequences being executed, an entropy or perplexity.

11. A non-transitory computer readable medium comprising a program for causing a computer to serve as a recovery support apparatus comprising:
   a recovery work sequence generation unit configured to generate one or more recovery work sequences to recover from an abnormality that has occurred in an apparatus group constituting a communication network;
   an index value calculation unit configured to calculate, as a predetermined index value with respect to the one or more recovery work sequences, at least one of i) stability of the recovery work sequences indicating certainty that recovery from the abnormality is possible according to execution of the recovery work sequences, and ii) safety of the recovery work sequences indicating influences on a performance value of the apparatus group and communication property of the communication network according to execution of the recovery work sequences;
   an output unit configured to output the predetermined index value for the one or more recovery work sequences calculated by the index value calculation unit to a predetermined output destination;
   an abnormality detection unit configured to detect the abnormality by (1) checking activation/deactivation of each apparatus included in the apparatus group or (2) receiving an alert from an apparatus included in the apparatus group;
   a gap calculation unit configured to calculate a gap between a predictive value of the safety of the recovery work sequences and an actual measurement of the safety of the recovery work sequences in the recovery work sequences being executed; and
   a re-learning instruction unit configured to instruct re-learning of a function that predicts performance value variation and communication property variation from one or more tasks associated with the recovery work sequences when the gap is equal to or greater than a predetermined threshold value, wherein the re-learning instruction unit is configured to instruct the index value calculation unit to perform the re-learning.

12. The non-transitory computer readable medium according to claim 11, wherein the index value calculation unit calculates the safety of the recovery work sequences using a function that has learned in advance a total value of a degree of influence on the performance value and a degree of influence on the communication property in a case where each task included in the recovery work sequences has been executed in advance.

13. The non-transitory computer readable medium according to claim 11, wherein the index value calculation unit calculates the safety of the recovery work sequences using a function that has learned in advance variation in the performance value and variation in the communication property in a case where each task included in the recovery work sequences has been executed.

14. The non-transitory computer readable medium according to claim 13, wherein the index value calculation unit calculates the safety of the recovery work sequences using SVR or a DNN as the function.

15. The non-transitory computer readable medium according to claim 11, wherein the index value calculation unit calculates the stability of the recovery work sequences using a probability of each task included in the recovery work sequences being executed, an entropy or perplexity.

* * * * *